United States Patent
Rodgers

[11] Patent Number: 5,903,212
[45] Date of Patent: May 11, 1999

[54] "ICE CUBE" NOVELTY

[76] Inventor: Nicholas A. Rodgers, c/o: Shaw & Co. SJO 892, P.O. Box 025216, Miami, Fla. 33102

[21] Appl. No.: 08/970,097

[22] Filed: Nov. 13, 1997

Related U.S. Application Data

[63] Continuation-in-part of application No. 08/508,964, Jul. 28, 1995, Pat. No. 5,697,182.

[51] Int. Cl.$^6$ ....................................................... G08B 3/00
[52] U.S. Cl. .................................. 340/309.15; 340/309.3; 340/309.4; 340/604; 43/17.5
[58] Field of Search ................................ 340/309.15, 623, 340/618, 604, 309.3, 309.4; 43/17, 17.5, 17.6; 441/16

[56] References Cited

U.S. PATENT DOCUMENTS

| | | | |
|---|---|---|---|
| 4,141,295 | 2/1979 | Campbell et al. | 102/407 |
| 4,157,627 | 6/1979 | Tschelisnik | 43/17 |
| 4,437,255 | 3/1984 | Reed | 43/17 |
| 4,748,761 | 6/1988 | Machovina | 43/17 |
| 5,295,882 | 3/1994 | McDermott | 441/16 |

Primary Examiner—Jeffery A. Hofsass
Assistant Examiner—Davetta C. Woods
Attorney, Agent, or Firm—Robert L. Westell; Dowell & Dowell, P.C.

[57] ABSTRACT

Floating Novelty for Drinks is motion operated to flash visual indication or aural indication.

12 Claims, 7 Drawing Sheets

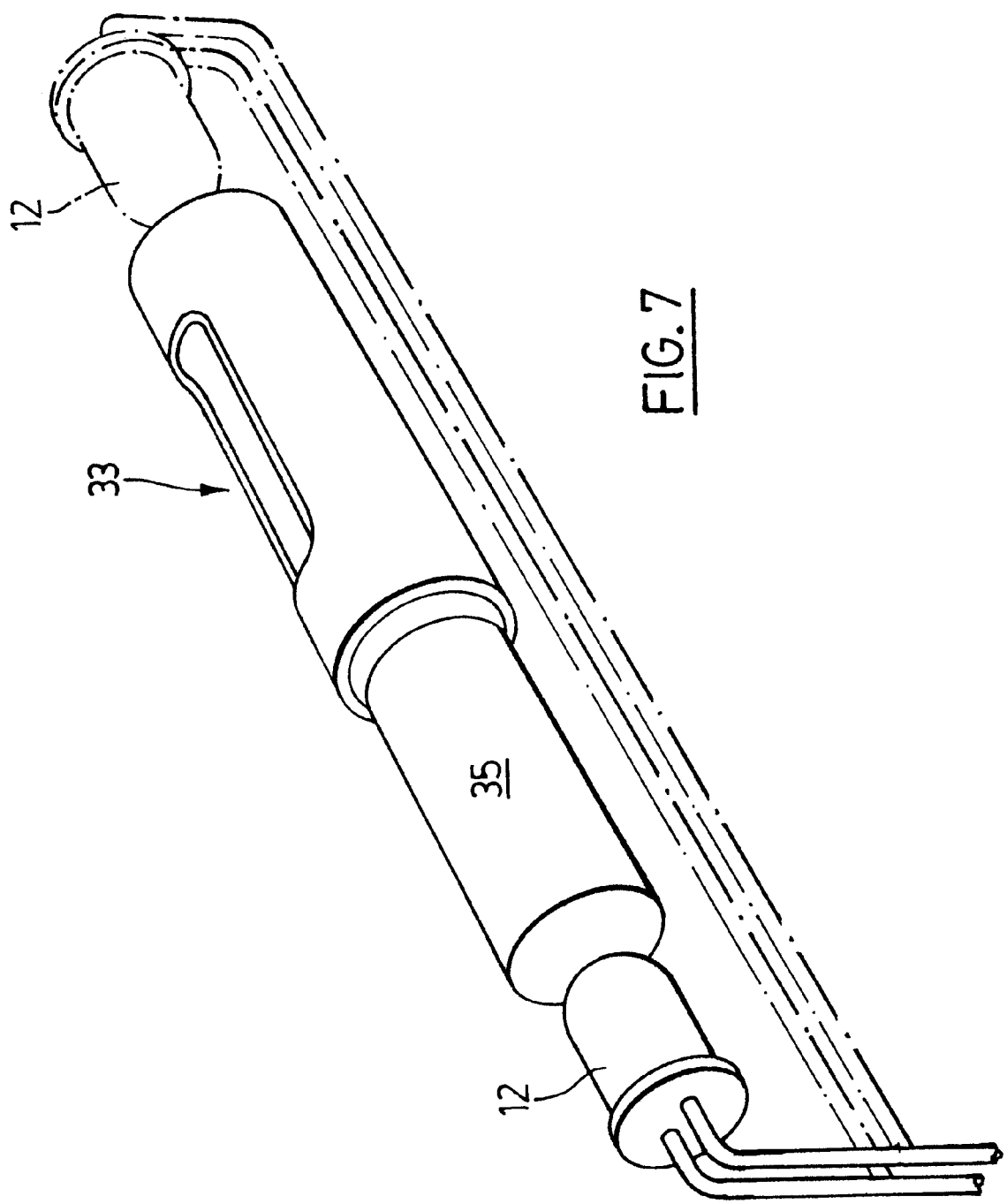

"ICE CUBE" NOVELTY

This application is a Continuation-in-Part of Application Ser. No. 08/508,964 filed Jul. 28, 1995, now U.S. Pat. No. 5,697,182.

This invention relates to a novelty designed to float in an alcoholic beverage or water or a mixture thereof.

The novelty is frequently called an 'ice cube', although it would not normally contain any frozen water.

The novelty includes a body on or in which is mounted a battery-powered light visible outside the body. Means are provided for turning on such light in response to motion of said body and extinguishing it after it is on for a predetermined duration. By this technique the battery life may be extended to a considerable degree.

The light is preferably an LED which may be powered by a smaller battery than most lights and provides a high intensity illumination in relation to the battery power used. The LED is preferably directed to be visible in a bar or other surrounding environment. An LED by itself may be directed upwardly. However the preferred mode of illumination is an LED directed into one end of a fibre optic. The fibre optic may be directed so that the light is emitted from the other end but preferably is designed to emit light from the side wall of the fibre. Thus, if desired a fibre with side emission, may be illuminated with an LED at each end of the fibre.

Advertising material may be positioned on the body or on a plaque therein to be illuminated by the light.

In drawings which illustrate a preferred embodiment of the invention.

Figure 1A:
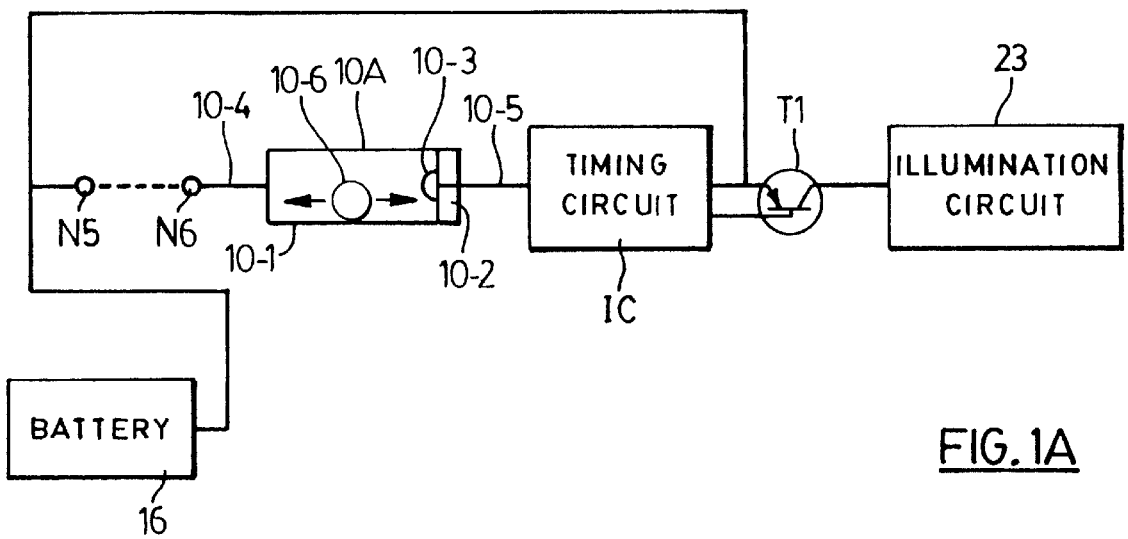
Figure 1B:
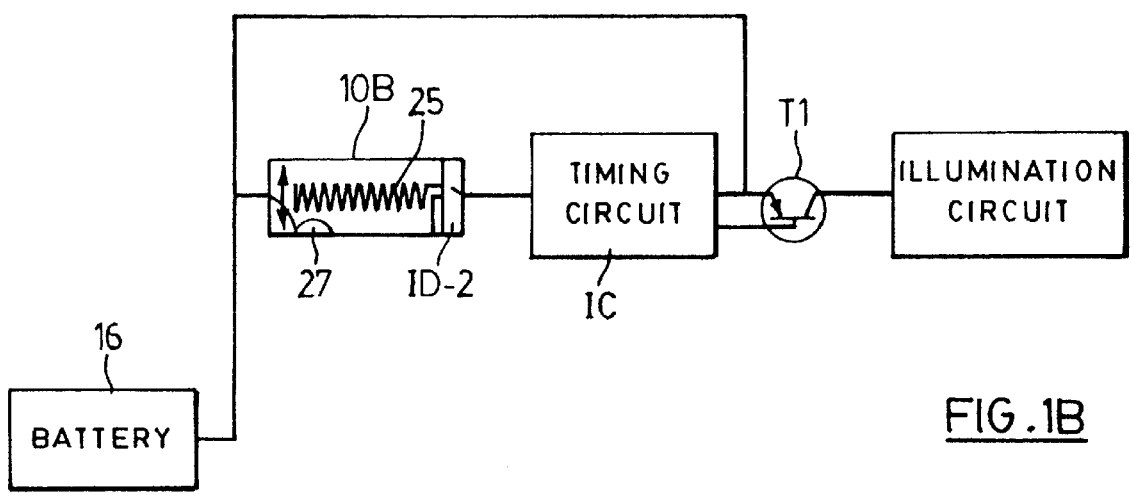
Figure 5:
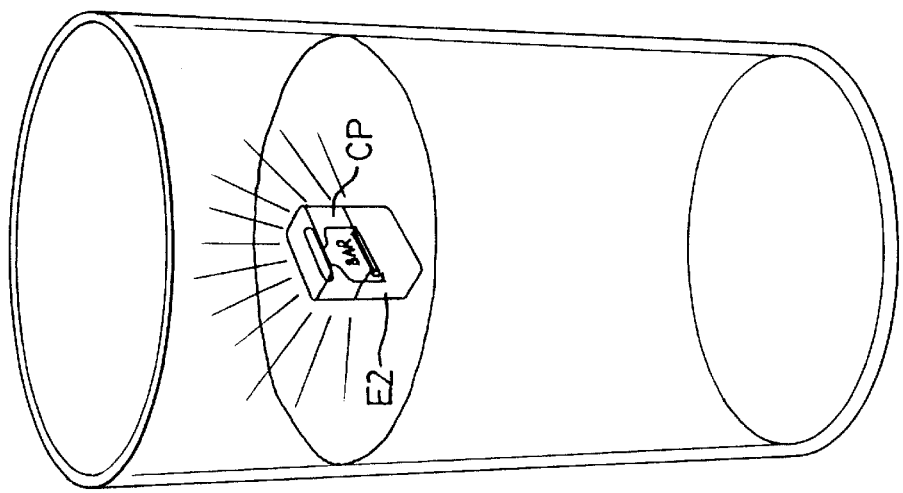
Figure 4:
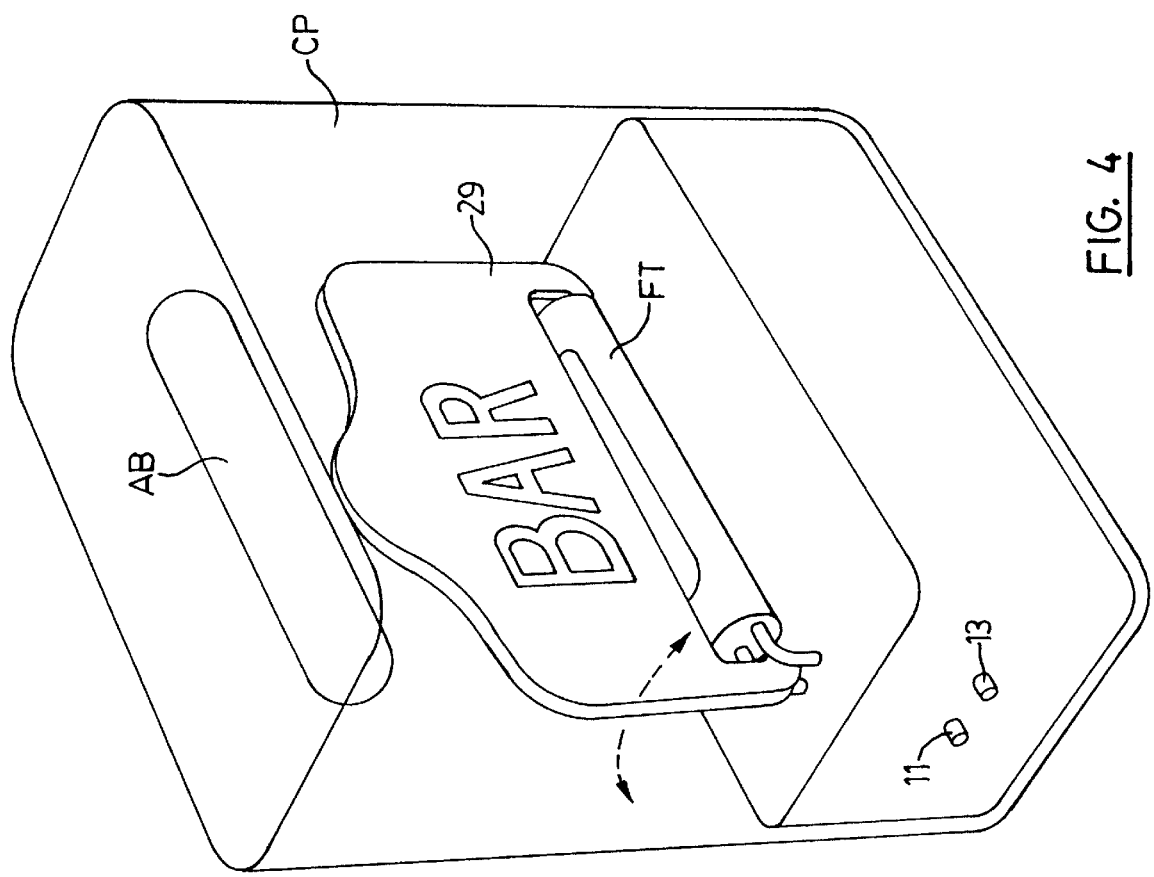
Figure 6:
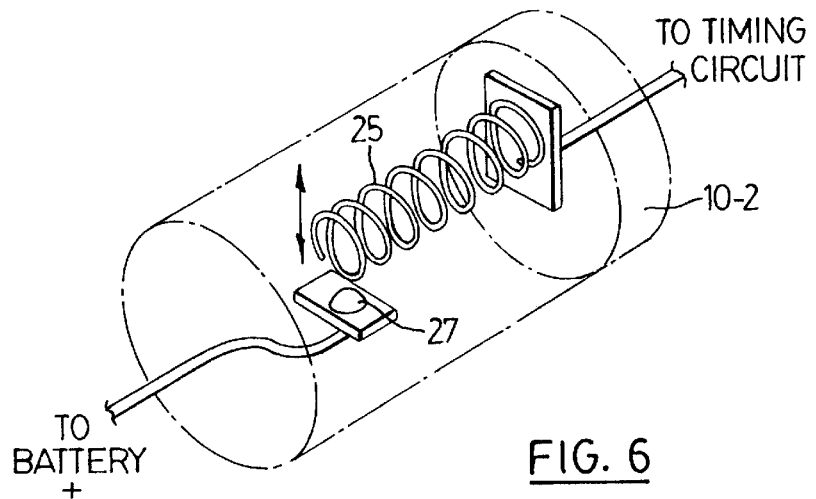
Figure 8:
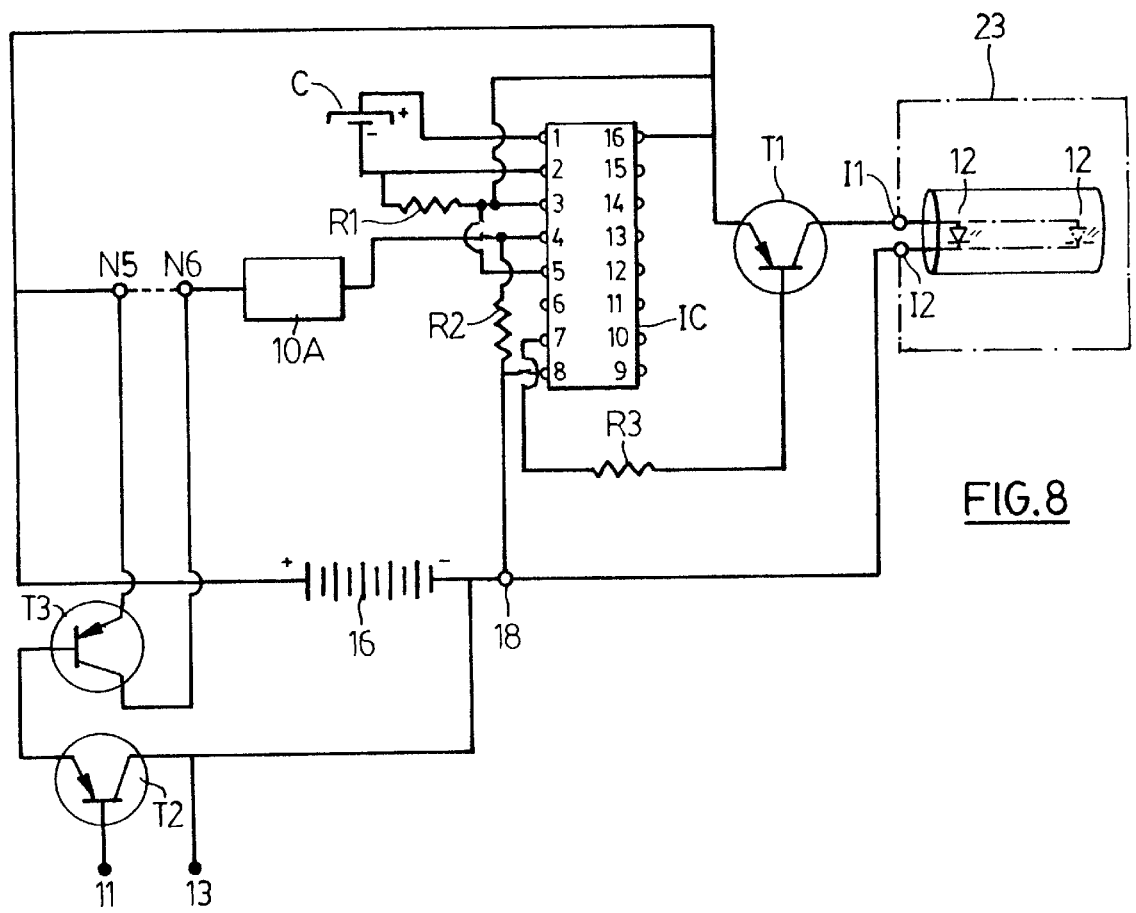
Figure 9:
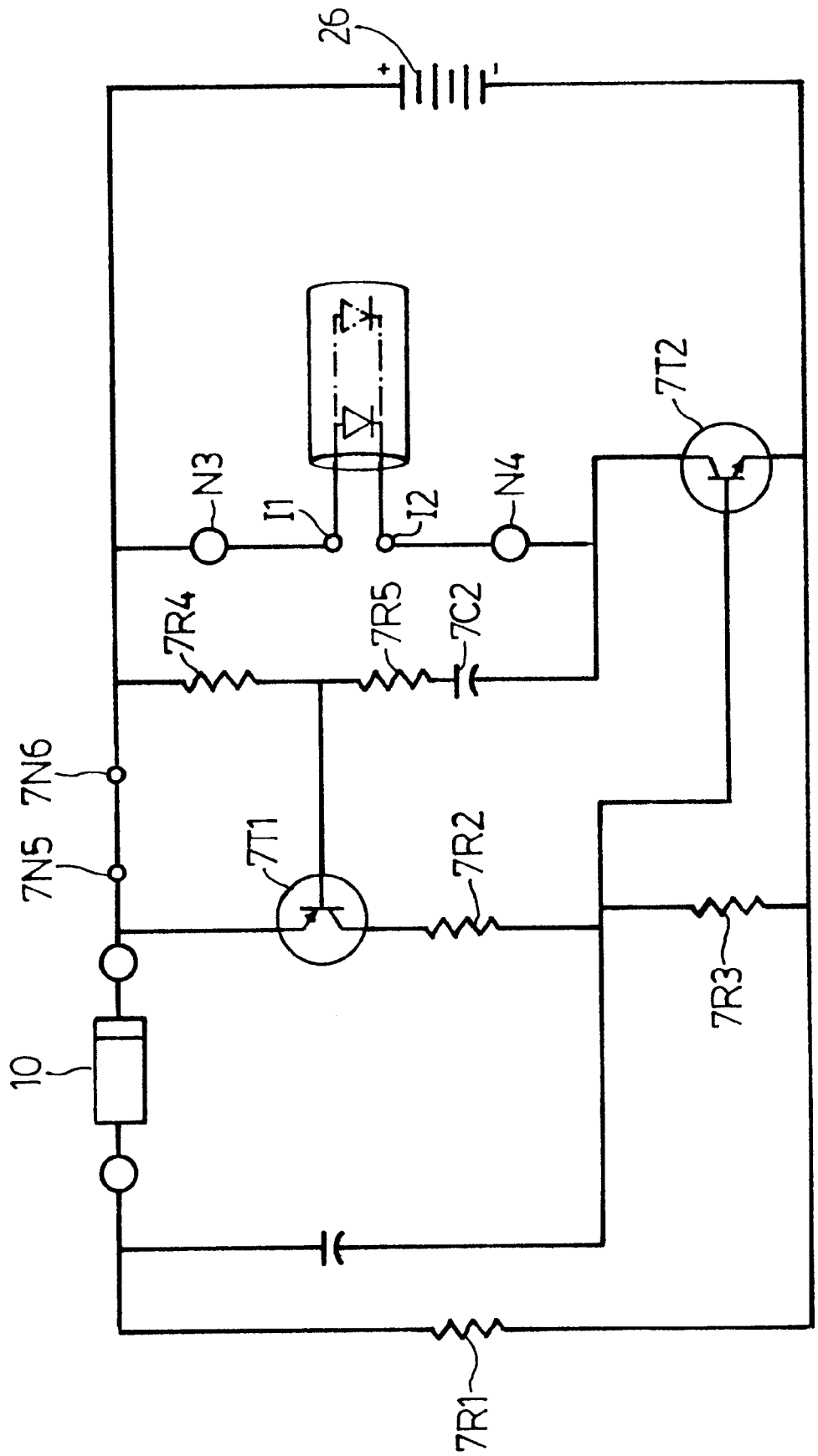
Figure 10:
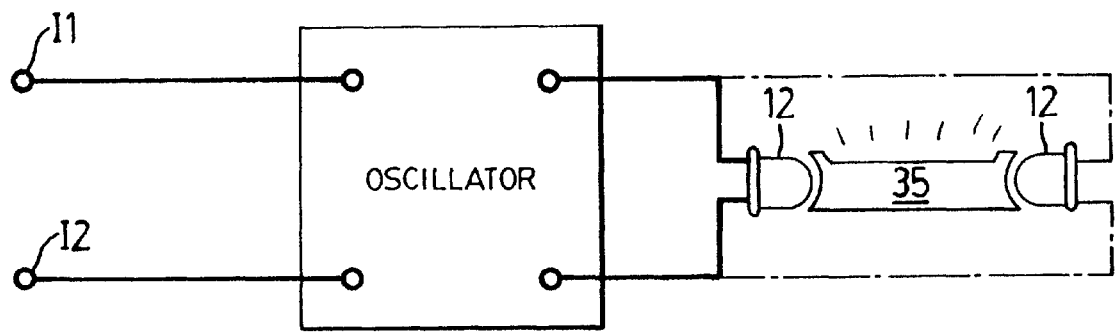
Figure 11:
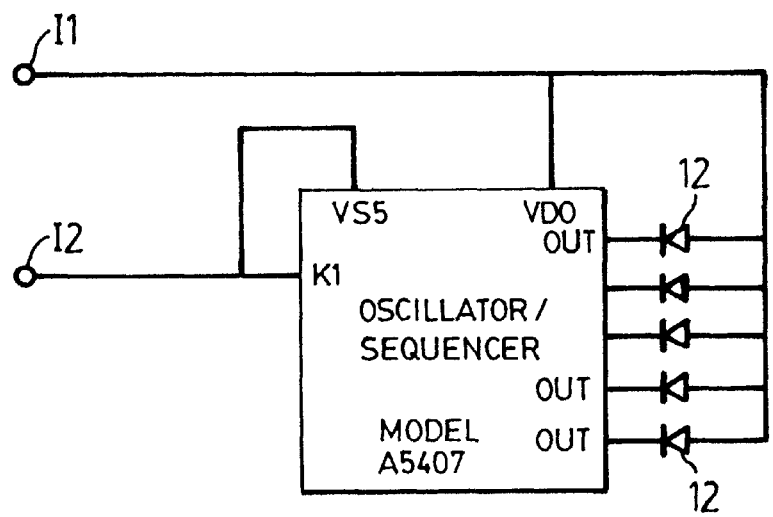
Figure 12:
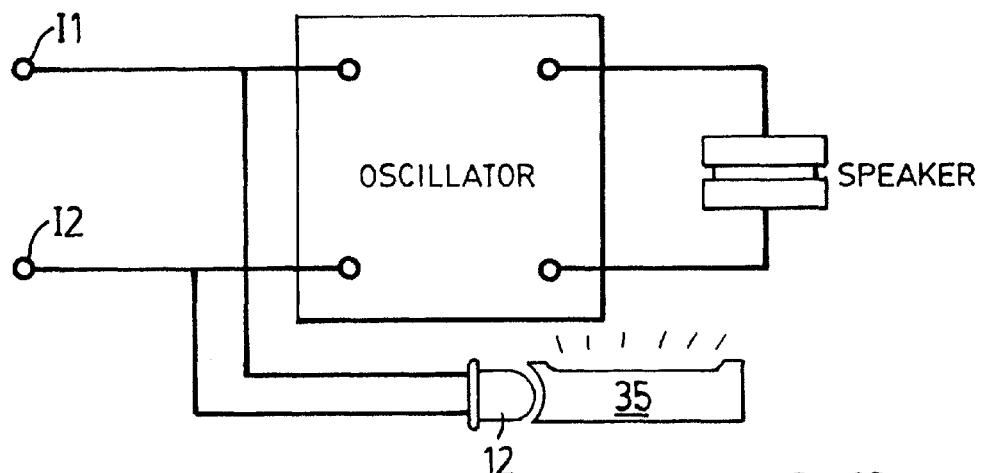

FIG. 1A is a schematic drawing showing a general arrangement of circuit elements:

FIG. 1B is a schematic drawing showing a general arrangement of circuit elements differing in details from that of FIG. 1A, FIGS. 2, 3, and 4 show successive stages in the construction of a novelty in accord with the invention, FIG. 5 shows the novelty floating in a beverage glass, FIG. 6 shows an alternative form of motion responsive switch to that shown in FIG. 1, FIG. 7 shows a preferred way of arranging the illumination components, FIG. 8 shows a suitable circuit for controlling the illumination of the novelty, FIG. 9 shows an alternate suitable circuit for controlling the illumination, FIG. 10 shows an illumination circuit for providing a flashing output, FIG. 11 shows an illumination circuit for illuminating a number of LED's in sequence, FIG. 12 shows an illumination circuit combined with a speaker.

In the drawings it is preferred to describe the circuit elements first and the physical aspects last.

In the drawings FIGS. 1A and 1B show schematically typical circuits to control the illumination.

In FIG. 1A and the detailed drawing of FIG. 8 a motion responsive switch being the ball switch 10A which, in response to motion provides alternate open-to-closed and closed-to-open transitions wherein the closed state connects the battery 16 to the timing circuit IC and the open state does not. In switch 10A a ball rolls freely in cylinder 10-1 whose walls are conducting except for insulating end 10-2. Thus the cylinder is permanently connected to line 10-4 and, when ball 10-6 contacts conducting button 10-3, connects to line 10-5. An open-to-closed transition when the timing circuit is not already timing an interval causes it to initiate and time the predetermined interval. (An open-to-closed transition when the timing circuit IC is already timing a power interval is ignored). During the interval the timing circuit lowers the base of transistor T1 relative to the emitter to put T1 in conducting mode which connects battery 16 to the illumination circuit where it will turn on the light, usually an LED 12. At the end of the timed interval the timing circuit turns off T1 (thus T1 represents a power switch, conducting or not between emitter and collector, which opens so that the battery no longer supplies power to the illumination circuit 23 (or 23T FIG. 8). The timing circuit then awaits a further off-to-on transition at switch 10A before timing a new power interval. The length of the timed interval may be adjusted so that the battery life can be best controlled. The motion responsive switch is a ball switch 10 a ball 10-6 connects cylinder wall 10-1 to button 10-3, and hence line 10-4 to the timing circuit IC. If a wire 11-1 exists connects battery 16 to switch 10 then the closure of switch 10A provides the off-to-on transition, to initiate the timing of the power interval.

In the absence of water sensitive probes a conductor connects N5 and N6.

However the battery-switch line may be provided with water sensitive probes between nodes N5 and N6 as best shown in FIG. 8 where transistor T1 and T3 are connected as shown. Probes 11 and 13 are bare to the outside of the novelty item.

By 'water sensitive probes' I mean probes which with conduct if the liquid between them is water, potable alcohol as sold in bars or a mixture of water and such alcohol.

When probes 11, 13 are in air, there is no conduction between them and the motion responsive switch cannot initiate the timing of a power interval. When water or alcohol connects probes 11 and 13, conduction there between lowers the base of transistor T2 and consequently the base of transistor T3 so that battery 16 is connected to switch 10 to cause the latter to initiate a power interval.

The circuit of FIG. 1A can equally represent a timing and illumination circuit as shown in FIG. 9 where optionally a direct connection or water sensitive probers may be connected between nodes N5 and N6.

The arrangement of FIG. 1B uses the motion responsive switch of FIG. 6 instead of the ball switch. The cylinder 10B houses is a helical spring 25 which in motion will alternatively touch button 27 to close the switch and separate from it to open it. Thus, under motion the switch of FIG. 6, will provide an off-to-on transition to initiate timing of a power interval in the integrated circuit 1C as long as, at the time of the off-to-on transition, a power interval is not being timed. As with other motion responsive switches, the off-to-on switch transmission is ignored if there is a power interval already being timed.

A mercury switch may also be used as the motion responsive switch but these are sometimes found environmentally objectionable.

FIG. 8 shows in some detail one version of FIG. 1. The battery 16 is connectable to over motion responsive switch to terminal 4 of integrated circuit IC. Preferred values for the circuit elements are as follows:

IC—INTEGRATED CIRCUIT #RR8503 MC 14528

T1—TRANSISTOR #2N3906

C—CAPACITOR 0.47 uF at 30 V

16—BATTERY 3 V

12—LIGHT SOURCE (LED)

10A—ACTIVATION SWITCH BALL, SWITCH, MERCURY OR OTHERWISE

R1—RESISTOR 1 MEGOHM 1 ⅛W
R2—RESISTOR 1 MEGOHM 1 ⅛W
R3—RESISTOR 1 MEGOHM 1 ⅛W (The integrated circuit and transistor referred to above are both available from Motorola Canada Limited, 3125 Steeles Avenue East, North York, Ontario, Canada).

In operation, with the shoe stationary and horizontal, and the switch 10 open the timing circuit will be quiescent but capacity C will be charged to the value of battery 16 (here 3V). Pin 4 of the integrated circuit will be held at 0 volts which is the voltage arbitrarily designated at node 18. The integrated circuit IC will be in reset condition having the effect that there will be a positive voltage at pin 7, rendering the transistor T1 (i.e. the power switch) non-conducting and maintaining the lights in the illumination circuit 23, off.

When motion of the novelty with nodes N5–N6 connected causes switch 10 to close, with a connection between battery positive and pin 4, (that is the switch 10A is changing state from "off" to "on"); the (0-1) or 0 V to 3V transition at pin 4 causes the integrated circuit IC to go to "set" condition causing pin 7 of IC to go to 0 volts. This causes transistor T1 to conduct supplying power to the illumination circuit 23 for the timed or power interval, as determined by IC, C and R1. The 'set' condition of integrated circuit IC connects pin 3 with node 18 and in a time determined by C and R1 the circuit is returned to reset condition, extinguishing LEDs 12 and allowing C to recharge. The circuitry is further designed so that switch 10 must be turned off and on again (with the off to on transition occurring outside the power interval) before the integrated circuit can again be activated to set state.

It will be appreciated that the 'ground' shown at node 18 is instrument ground only and is unconnected to anything outside the shoe. The choice of node 18 as 'ground' is somewhat arbitrary but assists on the description of the circuit.

A preferred illumination circuit is discussed hereafter.

An alternative circuit is shown in FIG. 9.

In FIG. 9 the integrated circuit IC is replaced by discrete elements. A schematic distribution of these elements in the novelty article is not shown but it will be realized that they are placed as found convenient in the casing while position of the lights will be located as described in connection with the illumination circuit.

Exemplary only values of the circuit elements of FIG. 7 are indicated below:

7R1—1 MEGOHM
7R2—1 KILOHM
7R3—100 KILOHM
7R4—47 KILOHM
7R5—1 KILOHM
7C1—0.1 µf
7C2—10 µf
7T1—2N3906 PNP
7T2—2N3905 NPN
23—ILLUMINATION CIRCUIT
10—MOTION RESPONSIVE SWITCH

FIG. 9 shows a simple one shot circuit.

When motion responsive switch 10 is closed providing an of-to-on transition state, it applies positive voltage to 7C1 and the base of 7T2. This will cause 7T2 to conduct. This, in turn, supplies battery power to illumination circuit 23.

7T2 conducting also connects the negative side of 7C2 to the negative side of the battery. This will place the base of 7T1 at a potential less positive than its emitter which will cause it to conduct. 7T1 supplies positive voltage to the voltage divider 7R2 and 7R3 which supplies positive voltage to the base of 7T2. This will hold 7T2 on after 7C1 has charged and no longer conducts current to the base of T2.

The RC network formed by the resistors 7R4, 7R5 and 7C2 determines the length of time the LEDS will be on. When 7C2 charges, the potential on the base of 7T1 becomes less negative and 7T1 will cease to conduct. This, in turn removes the positive bias from the base of 7T2 (which acts as the power switch T1 of FIGS. 1A, 1B) which will turn off terminating the power interval and the flow of power to the illumination circuit.

To repeat the cycle, switch 26 must be opened and then reclosed (the latter outside a power interval) to initiate the timing of a new power interval.

Thus if, for any reason switch 10 remains closed the LEDS will be extinguished by the circuit described above after the interval illumination duration provided by the RC network.

The circuit of FIG. 9 may be provided with water-sensitive probes between nodes 7N5 and 7N6 as described in connection with FIG. 8, or with any motion responsive switch.

It cannot be said that the circuit of FIG. 9 is always preferable over that of FIG. 8 or vice versa. The circuitry of FIG. 9 is somewhat simpler. However, the circuitry of FIG. 8 may be made extremely compact. The integrated circuit of FIG. 8 may take advantages of a process called 'on board integrated circuitry'. In this process the integrated circuit, IC, is actually built into a (very small) circuit board and covered with a dot of epoxy. The size of the integrated circuit of FIG. 8 is about 3/16 inch in diameter and only 1/32 of an inch thick.

The circuits of FIG. 8 or FIG. 9 would require 3V power but it is preferred to use two 1½V. batteries in series. These batteries are collectively shown and referred to as battery 16.

The specific arrangement of the LEDs and associate components will be described in association with an illumination circuit 23.

An illumination circuit herein may include

Figure 3:
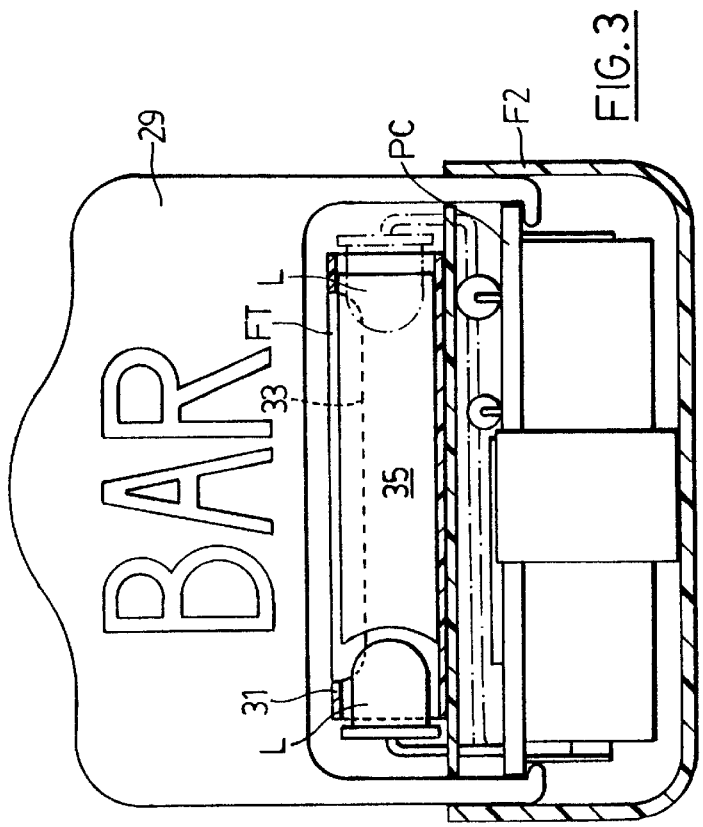
Figure 2:
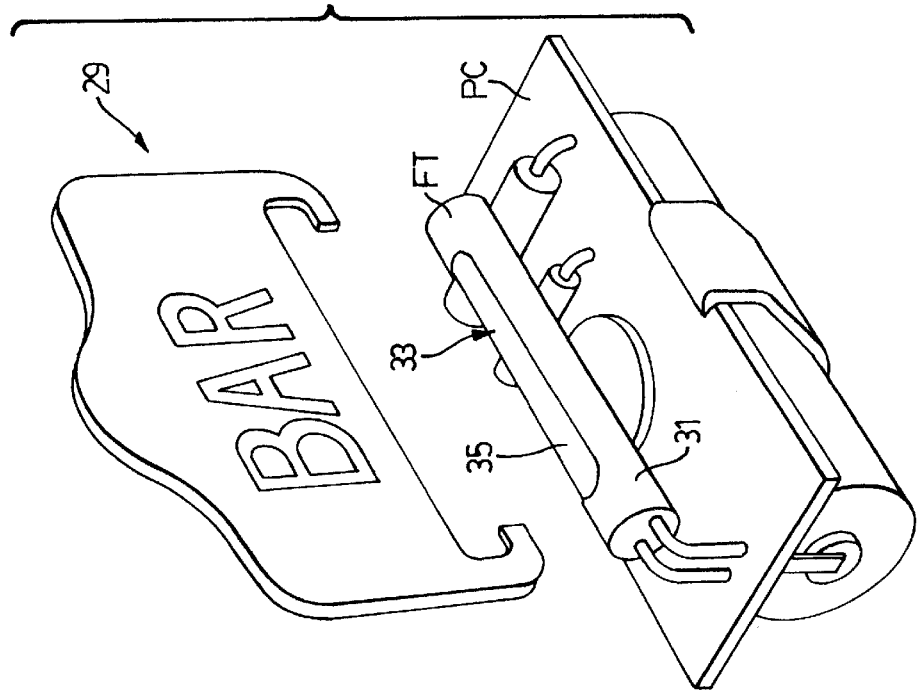

The body of the novelty ice cube is preferably constructed with a first encapsulated assembly of the components (connected as shown in FIG. 8 or FIG. 9) including: the focus tube FT, PC board PC, motion response switch, and advertising material which are shown schematically in FIGS. 2, and 3.

The first encapsulated assembly (encapsulation not shown) is preferably again encapsulated in tinted or opaque material E2. The second encapsulation leaves exposed the focus tube, as hereinafter described.

Before the first encapsulation it may be preferred to provide an advertising plaque 29, stating 'BAR' or depicting advertising any other material on clear plastic. The plaque is placed to receive the light emitted from the upper side of the focus tube FT.

Finally the device with focus tube or other lighting means and, optionally advertising is preferably encapsulated in a clear plastic generally rectilinear body CP. The rectilinear body will normally be sufficiently heavy to have negative buoyancy and will require an air 'bubble' AB to reduce the density to give the body positive buoyancy. The board and encapsulated components, will normally be weighted so that the advertising components ride uppermost.

The generally rectilinear shape makes the encapsulated body resemble an ice cube. FIG. 5 depicts a glass of beverage with the body floating therein.

The focus tube FT FIGS. 3 and 7 preferably comprises one or two LEDs electrically connected as shown in FIG. 8 or FIG. 9. In the preferred illumination arrangement the LED 12 (or both if there are two) is (are) arranged to shine longitudinally along the optic fibre 35 (see FIG. 3). The fibre is contained in an opaque sleeve 31 having an upward open (or transparent) slot 33.

The fibre 35 is adapted to emit a proportion of the light from the LED(s) up the upwardly open slot 33. This will cause the ice cube to glow, and to illuminate the advertising material if present.

Side emissions from the optic fibre 35 may be achieved in two ways. Fibres may be purchased particularly designed to radiate radially from the fibre. Alternatively an ordinary optic fibre, normally used for longitudinal transmission may have it's surface 'scuffed' to produce the radial radiation.

Other illumination arrangements, particularly those involving an LED may be used. These may be directed upwardly or otherwise. The LED is customarily provided with a lens L and such lens may be asymmetric if desired to produce a desired focus or effect.

In operation, for a beverage in a glass a rectilinear 'cube' in accord with the invention is placed in the drink and will float therein as long as there is enough left of the drink. With significant movement of the 'cube' the motion responsive switch will close causing an off-to-on transition. If the timing circuit is not timing a power interval, at the time of said transition, the transition will initiate such timing. The timing circuit will close a power switch (T1, FIGS. 1A, 8, T1, FIG. 1B, 7T2 FIG. 9) to the illumination circuit. The illumination circuit will cause the LEDs to light continuously or intermittently over the power interval in accord with the design of an illumination circuit. If the novelty ice cube has water sensitive probes, failure of the illumination circuit to light on motion will signal that the drink is empty.

FIGS. 8 and 9 show the nodes I1 and I2 at the entrance to the illumination circuit.

The illumination circuit shown in FIGS. 8 and 9 may be detached and replaced with one of the illumination circuits discussed below.

Although the preferred arrangement of the LEDs suggests the use of one or two LEDs, other arrangements may use three or more. Such multiple LEDs would usually be connected in parallel.

Although LEDs appear to be the most efficient mode of converting battery power to light intensity, the invention extends to other lighting sources.

In each of FIGS. 10, 11, and 12 an illumination circuit is shown for connecting across nodes I1 and I2 place of the illumination circuit connected across the same nodes, as shown in FIG. 8 or FIG. 9.

To provide a flashing output FIG. 10 shows an oscillator with its input connected across nodes I1 and I2. The oscillator is preferably of the type A5407 sold by HUA Electronics of Hong Kong. The oscillator output is connected to the LED 12 of the focus tube 35 of FIG. 7. The flashing output will, of course continue for the power interval as timed by the timing means.

FIG. 10 shows a power circuit including a sequencer/oscillator for connection to the illumination circuit terminals I1, I2 of FIGS. 8 or 9. In FIG. 10 the oscillator/sequencer may be adjusted by means not shown, but well known to those skilled in the art to sequence the 5 LED 12 (or other number) as desired and at a desired rate. The power interval as adjusted at C and R1 (FIG. 8) will then determine how many sequences occur. Similarly the power interval as adjusted at 7C2, 7R4 and 7R5 (FIG. 9) will determine how many sequences occur.

FIG. 11 shows an illumination circuit where an oscillator connected across terminal I1, I2 will power a speaker while the glow device of FIG. 7 is connected in parallel therewith.

I claims:

1. Novelty comprising:

a body, means for rendering said body buoyant in alcohol or water, or a mixture thereof, a battery, a motion responsive switch alternating between ON and OFF states when moved, a timing circuit connected to said battery over said motion responsive switch, said timing circuit being designed to time an interval, illumination circuit including a light, a power switch for connecting said battery to said illumination circuit, said timing circuit being responsive to connection to said battery when not timing an interval to close said power switch and start timing an interval, and being independent of the state of said motion responsive switch when timing an interval, said timing circuit being responsive to completion of said interval to open said power switch.

2. Novelty for location in a drinking glass, comprising a body, means for providing that said body will be buoyant in a beverage, a light, means for illuminating said light only responsive to movement of said body, occurring outside a timed interval, said means being independent of movement of said body during said interval.

3. Novelty as claimed in claim 1, wherein said light is an LED.

4. Novelty as claimed in claim 2, wherein said light is an LED.

5. Novelty as claimed in claim 3, wherein said body defines an attitude in such liquid and where said LED is upwardly directed with the body in said attitude.

6. Novelty as claimed in claim 5, wherein said body defines an attitude when floating in a liquid, means defining a tube extending approximately horizontally when said body is in said attitude, said LED being oriented to illuminate said cylinder, an opening in the cylinder which is on the upper side in said attitude.

7. Novelty as claimed in claim 3, wherein said body defines an attitude when floating in said liquid, means defining a tube extending approximately horizontally when said body is in said attitude, fibre optic in said tube, said LED being oriented to illuminate said fibre, an opening in the cylinder which is on the upper side in said attitude, said fibre optic radiating upwardly through said opening.

8. Novelty as claimed in claim 3, wherein there is provided a plaque adapted to receive light from said LED.

9. Novelty as claimed in claim 4, wherein said body defines an attitude in such liquid wherein said LED is upwardly directed with the body in said attitude.

10. Novelty as claimed in claim 4, wherein said body defines an attitude when floating in said liquid, means defines a tube extending approximately horizontally when said body is in said attitude, said LED being oriented to illuminate said cylinder, an opening in the cylinder which is on the upper side in said attitude.

11. Novelty as claimed in claim 4, wherein said body defines an attitude when floating in said liquid, means defining a tube extending approximately horizontally when said body is in said attitude, fibre optic in said tube, said LED being oriented to illuminate said fibre, an opening in the cylinder which is on the upper side in said attitude, said fibre optic radiating upwardly.

12. Novelty as claimed in claim 4, wherein there is provided a plaque adapted to receive light from said LED.

\* \* \* \* \*